US006256394B1

(12) United States Patent
Deville et al.

(10) Patent No.: US 6,256,394 B1
(45) Date of Patent: Jul. 3, 2001

(54) TRANSMISSION SYSTEM FOR CORRELATED SIGNALS

(75) Inventors: Yannick Deville, Villecresnes; Jean-Christophe Boissy, Saint-Maurice, both of (FR)

(73) Assignee: U.S. Philips Corporation, New York, NY (US)

( * ) Notice: Subject to any disclaimer, the term of this patent is extended or adjusted under 35 U.S.C. 154(b) by 45 days.

(21) Appl. No.: 08/781,572

(22) Filed: Jan. 9, 1997

(30) Foreign Application Priority Data

Jan. 23, 1996 (FR) ........................................ 96 00752

(51) Int. Cl.[7] ........................................ H04B 15/00
(52) U.S. Cl. ........................................ 381/94.7; 381/56
(58) Field of Search ........................ 381/94.2, 94.7, 381/56, 57, 66

(56) References Cited

U.S. PATENT DOCUMENTS 5,323,459 6/1994 Hirano ........................ 379/391
5,361,303 * 11/1994 Eatwell .
5,450,494 * 9/1995 Okubo et al. ........................ 381/57
5,742,694 * 4/1998 Eatwell ........................ 381/94.2
5,796,819 * 8/1998 Romesburg ........................ 379/406

FOREIGN PATENT DOCUMENTS

WO9305503 3/1993 (WO) .

* cited by examiner

*Primary Examiner*—Vivian Chang
(74) *Attorney, Agent, or Firm*—Edward W. Goodman

(57) ABSTRACT

Signal transmission system includes a processor (SEPAR) for isolating an estimate ($I_L$) for at least one wanted signal ($X_L$) contained in at least one mixed signal (Ea). At least one sensor (Ma) detects the mixed signal which includes at least the wanted signal ($X_L$) and at least two correlated interference signals (Pa, Pb) generated in response respectively to two correlated electric signals (CRa, CRb). The processor (SEPAR) receives on the input the detected mixed signal (Ea) and the two correlated electric signals (CRa, CRb). By decorrelating the estimate ($I_L$) relative respectively to the correlated electric signals (CRa, CRb), the processing means extracts the estimate ($I_L$) of the wanted.

5 Claims, 5 Drawing Sheets

TRANSMISSION SYSTEM FOR CORRELATED SIGNALS

BACKGROUND OF THE INVENTION

1. Field of the Invention

The invention relates to a signal transmission system comprising processing means for isolating an estimate for at least one wanted signal contained in at least one mixed signal, at least one sensor for detecting the mixed signal, the mixed signal comprising at least the wanted signal and at least two correlated interference signals which are produced by two sources of the system in response respectively to two correlated electric signals.

This signal transmission system may in turn relate to an audio signal broadcasting system present, for example, in a motor car or in a room. The system comprises a sound source formed, for example, by a car radio, a compact disc reader, a television receiver, a hifi system or by other stereophonic sound sources. The system may include voice recognition which permits a user to give voiced commands for controlling notably the sound source.

This signal transmission system may in turn relate to a teleconference system which comprises a transmitting station which communicates with a receiving station for which stations the conversations captured in the transmitting station are to be recovered in the receiving station without degradation.

This signal transmission system may also relate to systems for which radio broadcast signals arrive by radio link in the form of mixtures on antennas, the radio broadcast signals being locally interfered by noise sources.

2. Description of the Related Art

By way of example, let us consider the case where the wanted signal is a speech signal coming from a person.

A first situation appears in the case of the transmission of conversations via teleconferencing. A microphone installed in a transmitting station captures the voices as well as the ambient noise, and all the sounds thus captured are transmitted to the receiving station. Evidently, the sounds broadcast by loudspeakers situated in the transmitting station and coming from the receiving station, will also be captured and then broadcast to the receiving station and cause undesirable echoes. A solution restricted to certain types of signals is revealed in the document entitled: "Stereophonic Acoustic Echo Cancellation—An Overview of the Fundamental Problem" by M. M. Sondhi, D. R. Morgan, J. L. Hall, IEEE Signal Processing Letters, Vol. 2, No. 8, 1995, pp. 148–151.

None the less, when the loudspeakers broadcast stereophonic sounds, no satisfactory technique is known which permits correctly isolating the person's voice expressed in the microphone.

Another situation occurs in the case where the voice to be captured is that of a driver who expresses himself in a microphone installed in an automobile over the past few years, there have been developed possibilities for the driver to have voice control of equipment inside an automobile. The object of this is to set the driver free from movements he has to make to effect certain settings or to have certain controls in the automobile itself. It is thus necessary, in a first period to recognize the voice message pronounced by the driver and then, in a second period, to decode this voice message and extract therefrom commands intended to influence the equipment. By placing several microphones inside the driver's compartment, there is achieved that the driver's voice is isolated and the commands it contains are decoded to take appropriate action. But the automobile is a considerably noisy environment where known techniques are not satisfactory, notably, when the driver's compartment contains loudspeakers which broadcast stereophonic sounds. Each time, mixed signals contain mutually correlated signals, it is very difficult to separate them and also to separate other signals that form the mixed signal.

SUMMARY OF THE INVENTION

It is a main object of the invention to propose a signal transmission system which is suitable for separating signals contained in mixed signals comprising correlated signals and which is more robust to interference than prior-art techniques.

A particular object of the invention is to check the sound volume returned to the user of the system on the basis of voice messages pronounced by the user.

SUMMARY OF THE INVENTION

Receives on the input, the detected mixed signal and the two correlated electric signals wherefrom, the processing means extracts the estimate of the wanted signal contained in the detected mixed signal by decorrelating, via multiple shifts, the estimate relative respectively to the correlated electric signals.

The voice message is thus correctly separated from all the other sound signals present in the sound environment, these other signals coming from whatever sound source is present in the vehicle. The invention provides an effective solution to the processing of stereophonic signals, that is to say, correlated signals, which is impossible with known processings.

The correlated electric signals which give rise to correlated interference signals may be obtained from the loudspeakers of a car radio, a television receiver, a hi-fi system or other sound sources.

In the cases where the sensor is a microphone, where the mixed signal is an ambient sound signal captured at the listening end by the microphone, where the wanted signal is a voice message sent by a speaker at the listening end and, where the voice message is interfered by stereophonic signals broadcast by loudspeakers which form the sources, the system is such that the processing means extracts the estimate of the voice message contained in the ambient sound signal by decorrelating the estimate of the voice message relative, respectively, to the stereophonic signals.

According to a particular embodiment, converting means permits to converting the estimate of the voice message into at least one voice control. The voice controls may be used for controlling in return the sound source from which the correlated signals come. Thus, a voice control may request the modification of the sound volume produced by the car radio. When the system detects such a voice control, it subsequently applies this control to the car radio.

But the use of voice controls is not restricted to the control of the sound source from which the correlated signals are taken. The voice controls may also be used for controlling the other sound sources or for acting on actuators at the listening end, in the car or in the room, for example. Thus, a first voice control may request a lowering of the sound volume broadcast by the car radio, after which a second voice control may request the windows of the car to be closed. The means producing the voice controls are therefore connected to the respective actuators via the voice controls provided to this effect.

In the case of a teleconference system comprising a transmitting station and a receiving station interconnected by at least an up channel and at least a down channel, the stations comprising each at least two microphones and at least two loudspeakers broadcasting two stereophonic signals, the system is characterized in that the processing means undesirable echoes generated by the stereophonic signals arriving at the transmitting station coming from the receiving station, the transmitting station transmitting in stereo only the estimates of the local voice message to the loudspeakers of the receiving station.

The speech signals pronounced by the speaker may thus be perfectly separated from the correlated signals broadcast by the loudspeakers and coming from the other station. The transmitting station can thus transmit solely the speaker's signals from the transmitting station to the receiving station. This makes it possible to avoid the phenomena of echoes which manifest themselves if the signals produced by the loudspeakers were retransmitted in a loop to the station that has broadcast them.

In the case where the sensor is an antenna which receives a radio broadcast signal, the system permits separation of the radio broadcast signal by clearing it of all the correlated signals coming from sources that transmit interference signals.

These and other aspects of the invention will be apparent from and elucidated with reference to the embodiments described hereinafter.

DESCRIPTION OF THE PREFERRED EMBODIMENTS

Figure 1:
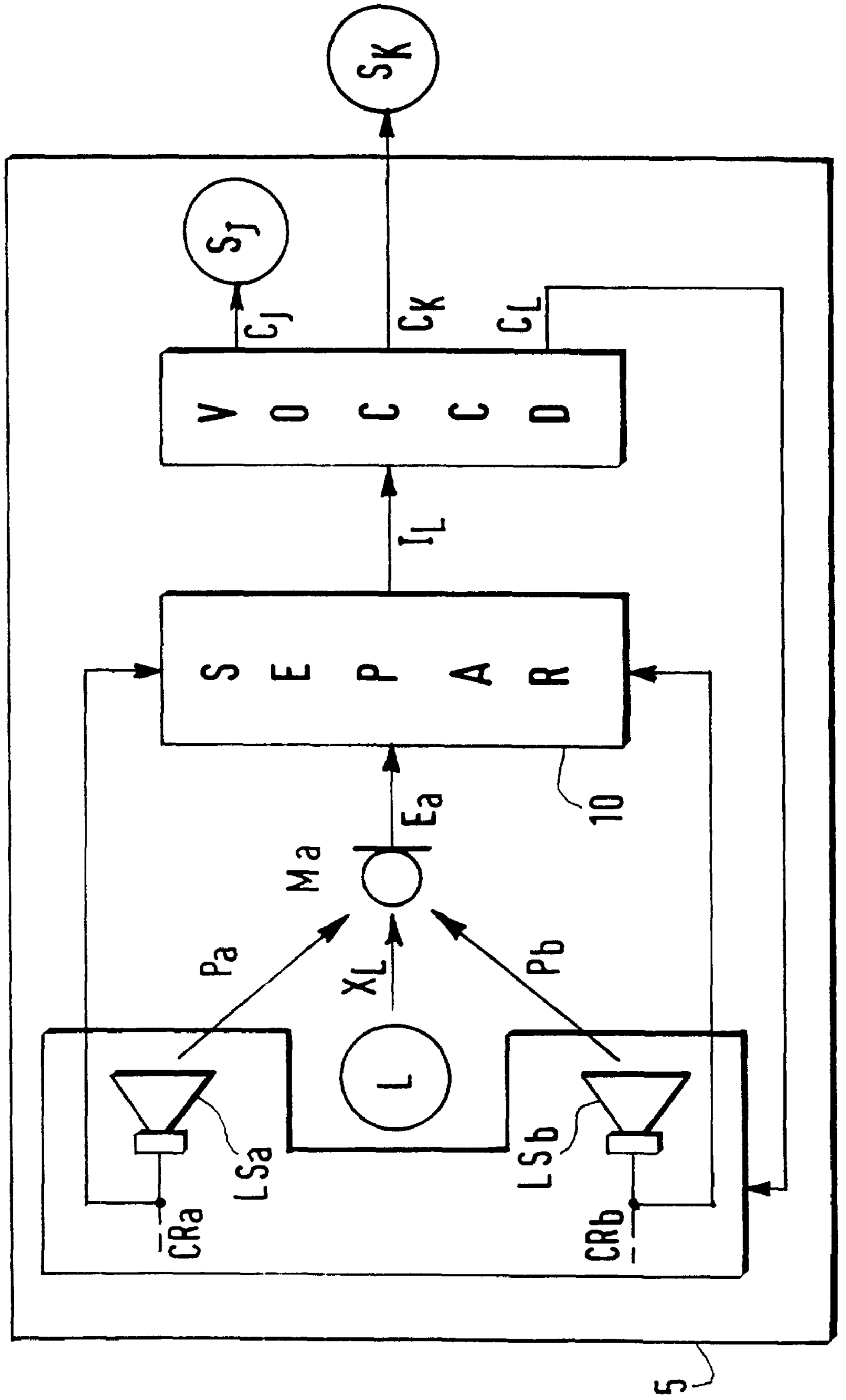
FIG. 1 shows a diagram of an audio system for extracting the voice message of a single speaker, this system further comprising voice recognition means.

FIG. 1 represents a voice recognition audio system 5, according to the invention, for recognizing a single speaker L. By way of example, let us consider the case of sound sources situated in a an automobile, the possibility being given to the speaker, for example, to the driver of the vehicle, to express voice messages to control various actions in the driver's compartment. The driver's messages are captured by a microphone Ma which also captures all the sound signals which occur in the driver's compartment. These sound signals may comprise any kind of noise, but also, notably, stereophonic sounds broadcast by a car radio.

The sound signals which occur at the listening end are captured and converted by the microphone into an electric signal Ea. The signal Ea is a mixed signal which comprises the wanted signal $X_L$ sent by the speaker, as well as interference signals Pa and Pb coming from the loudspeakers LSa, LSb. The sound signals broadcast by the loudspeakers are stereophonic signals, that is to say, correlated signals obtained on the basis of correlated electric signals CRa and CRb which excite the loudspeakers. Because of the correlation between the signals, the separation of the wanted signal $X_L$ from the interference signals CRa and CRb is impossible to realize with known techniques. Thanks to the invention it is possible to separate the wanted signal $X_L$ correctly as an estimate $I_L$ of the wanted signal $X_L$.

The estimate $I_L$ is obtained by processing means SEPAR 10 which implement an adaptive method that decorrelates the estimate $I_L$ relative to correlated electric signals CRa and CRb.

Figure 2:
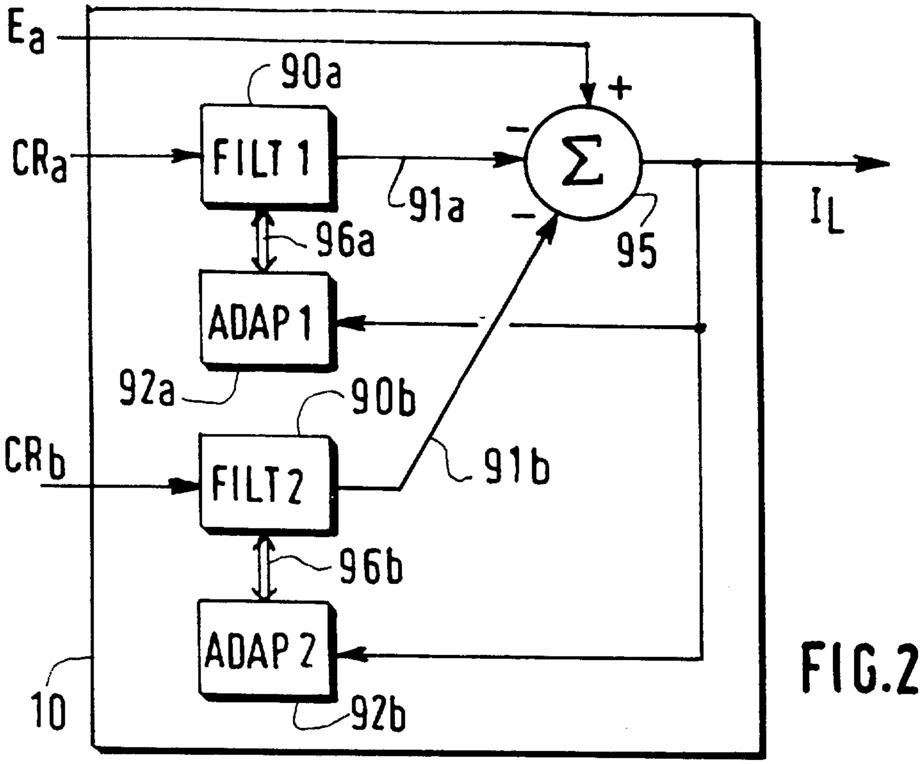
FIG. 2 represents a diagram of an embodiment for adaptive filter processing means for decorrelating the signals.

FIG. 2 is a diagram of an embodiment of processing means SEPAR 10. The interference signals CRa, CRb enter adaptive filter means FILT1 90*a* and FILT2 90*b*, respectively. A summing means Σ95, for example a summator, receives the mixed signal Ea from which it subtracts the outputs of the filter means FILT1 and FILT2. The output of the summator produces the estimate $I_L$. The processing means 10 is adaptive, that is to say, it adapts itself to variations of the characteristics of the input signals. Adapting means ADAP1 and ADAP2 determine the updates which are to be applied to the filters FILT1 and FILT2, so that they permit the summator of produce a reliable estimate of the wanted signal $X_L$, this estimate being still reliable when the characteristics of the input signals follow a normal course.

Each adaptive filter has a structure known per se (FIG. 4) comprising, for example, a bank of delay cells, the cell each delivery the signal CRa delayed by k samples, each delayed signal being weighted with a respective weighting factor $h_a(k)$. The summation of all the weighted delayed signals produces the output signal of the filter (connections 91*a*, 91*b*).

In a general manner, the decorrelation of the signals $I_L$ relative to the signals CRa or CRb, shifted by an integral number of samples k, may be expressed (for CRa, for example) by:

$$E[I_L(t)\cdot CRa(t-k)]=0 \tag{1}$$

in which the variable t corresponds to time and forms the integer index of the current sample. The term E represents the mathematic expectation of the expression in brackets with respect to time. Thus, by canceling the set of contributions determined by equation (1) applied to the signal samples for $0 \leqq k \leqq M$, the decorrelation provided, in the case of the filter FILT1, is effected, while M are the number of cells of the filter.

In a particular manner, the weighting factors $h_a(k)$ may be adapted according to the equation:

$$h_2(k)(t+1)=h_a(k)(t)+\eta\cdot I_L(t)\cdot CRa(t-k) \tag{2}$$

in which the variable t is time.

For effecting the decorrelation according to the equation (1) or (2), the adapting means ADAP1 receives the interference signal CRa and its delayed versions and the output signal $I_L$ of the summator 95 and all the factors $h_a(k)$ (bus 96*a*). Similar operations are carried out by the adapting means ADAP2 which acts on the interference signal CRb to obtain the total decorrelation of the estimate $I_L(t)$ relative to the two interference signals. With each updating, new weighting factors are fed to the filter means 90*a*, 90*b* (bus 96*a*, 96*b*).

Figure 4:
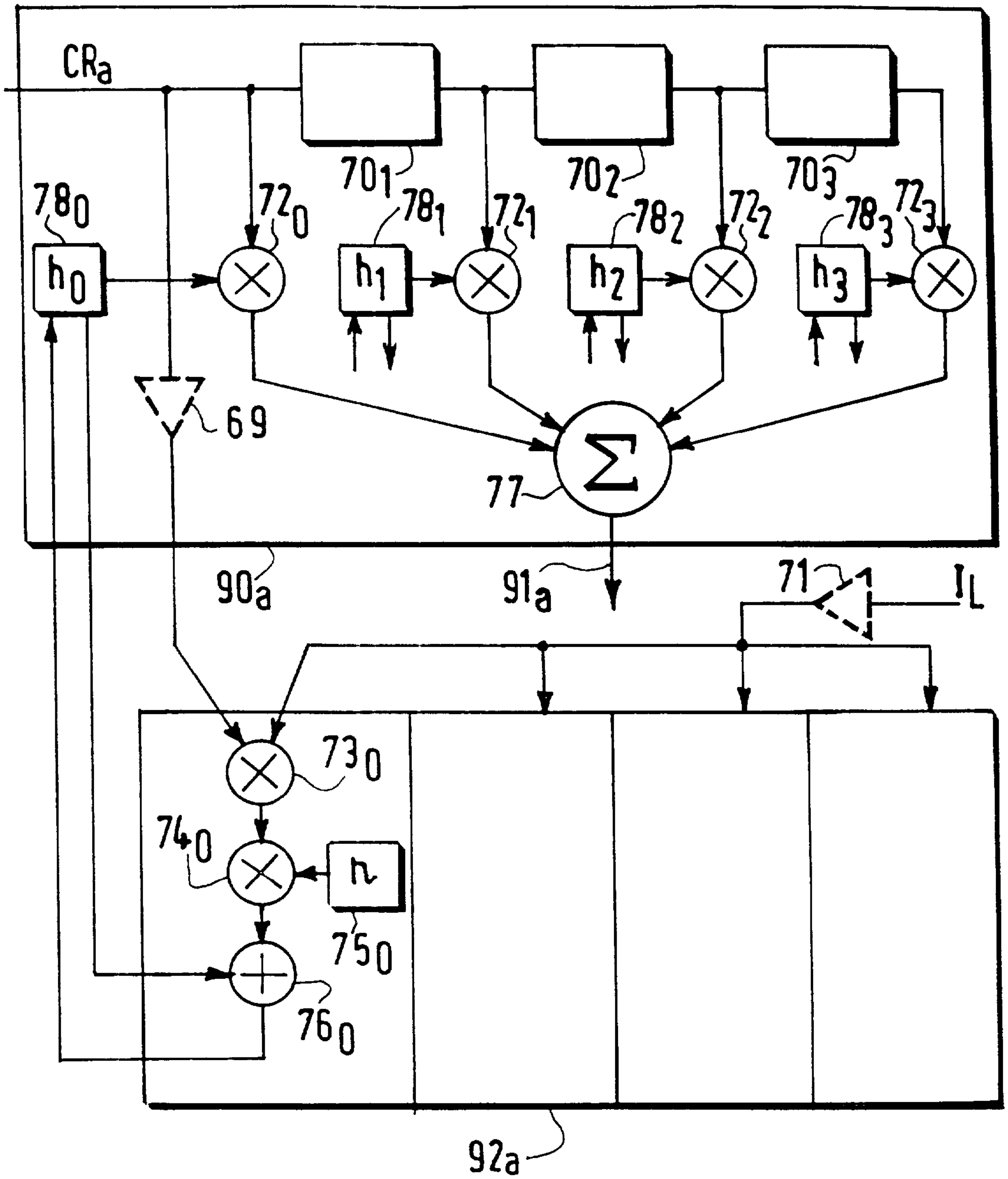
FIG. 4 represents a diagram of an embodiment for adaptive filter means.

FIG. 4 represents a diagram of the processing which corresponds to, for example, the processing of signal CRa via an example restricted to four weighting factors. The signal CRa passes through three delay cells 70$_1$, 70$_2$, 70$_3$.

The signal on the input of the first cell and the output signals of the three cells are multiplied by the respective weighting factors $h_a(0)$, $h_a(1)$, $h_a(2)$, $h_a(3)$ in multiplier means $72_0$, $72_1$, $72_2$, $72_3$. Storage means $78_0$ to $78_3$ store the weighting factors. The results obtained are added together in a summator 77. The adapting means 92*a* adapt the weighting factors in accordance with equation (2). Let us consider the adaptation of the factor $h_a(0)$ performed at time t. A multiplier cell $73_0$ performs the multiplication of the signal CRa by the estimate $I_L$. The result obtained is multiplied by an adaptation gain $\eta$ in a multiplier cell $74_0$. The adaptation gain is stored in a means $75_0$. The result obtained is increased by the previous value of $h_a(0)$ so as to obtain the new weighting factor $h_a(0)$ at time t+1. An analogous process is carried out for the other weighting factors. The weighting factors of the filter means FILT2 are adapted similarly.

According to a particular embodiment, it is possible to realize the adaptation not directly from the interference signals CRa, CRb and from the estimate $I_L$, but from the modified versions of these signals. The adaptation may thus be carried out in accordance with:

$$E[f\{I_L(t)\}\cdot g\{CRa(t-k)\}]=0 \quad (3)$$

or, more particularly, in accordance with:

$$h_a(k)(t+1)=h_a(k)(t)+\eta\cdot f[I_L(t)]\cdot g[CRa(t-k)], \quad (4)$$

in which at least one of the functions f(.) or g(.) is a non-linear function. Similar equations are applied to the filter FILT2.

For applying these functions, the diagram of FIG. 4 is modified by incorporating a means 69 for applying the non-linear function g(.) to the interference signal CRa and to each of its delayed versions, and by incorporating a means 71 for applying the non-linear function f(.) to the estimate $I_L$ before, they are fed to the multiplier means $73_0$. The means 69 and 71 are indicated in dashed lines in this Figure, because they may be omitted. The importance of these non-linear functions resides in the fact that this allows of obtaining a better speed and a better adaptation precision of the filters FILT1 and FILT2 by choosing functions f(.) and g(.) adapted to the signals to be processed either totally for all the coefficients or specifically for each coefficient.

The processing means 10 have been described on the basis of adaptive filter means which realize the described decorrelation. It is alternatively possible to carry out this decorrelation by utilizing adaptive source-separation means. In that case, the interference signals are not regarded as unmixed signals, but processed as any signal.

Figure 3:
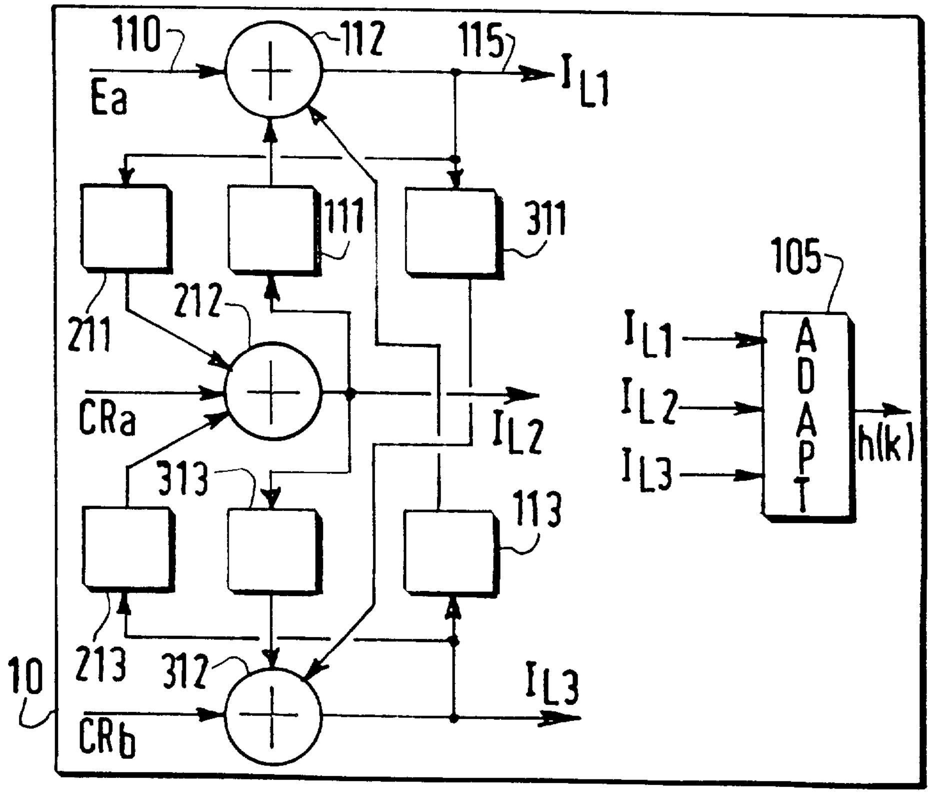
FIG. 3 represents a diagram of an embodiment for source separation processing means for decorrelating the signals.

FIG. 3 describes a recursive structure intended for producing three estimate signals: $I_{L1}=\langle X_L \rangle$, $I_{L2}$, $I_{L3}$. The processing means is thus source-separation means which comprise a plurality of adaptive filter units 111, 211, 311, 113, 213, 313. This structure comprises a first summator 112 which has an input 110 connected to the mixed signal Ea and an output 115 for producing the estimate signal $I_{L1}$. A second summator 212 has an input connected to the signal CRa and an output which produces the estimate signal $I_{L2}$. A third summator 312 has an input connected to the signal CRb and an output which producing the estimate signal $I_{L3}$. A second input of the first summator 112 is connected to the output of the second summator 212 via the adaptive filter unit 111 which filters the output signal of the second summator. A third input of the first summator 112 is connected to the output of the third summator 312 via the adaptive filter unit 113 which filters the output signal of the third summator.

Similarly, a second and a third input, of the second summator 212 are connected to the output of the first summator 112 and of the third summator 312 respectively, via the respective filter units 211 and 213 which filter the output signals of the first and the third summator, respectively.

Similarly, the third summator 312 is connected to the outputs the other summators 112 and 212 via the filter units 311 and 313 which filter the output signal the first and of the second summators, respectively.

The filter coefficients of the filter units are adapted in adapting means ADAPT 105 to which the estimate signals $I_{L1}$, $I_{L2}$, $I_{L3}$ are applied. Therefore, the adapting means 105 the signals $I_{L1}$, $I_{L2}$, $I_{L3}$ in accordance with the equations (1) to (4) in a manner described previously. Therefore, the signals CRa, CRb are replaced by one of the signals $I_{L1}$, $I_{L2}$, $I_{L3}$, that is to say, by the signal that is connected to the input of the respective filter. Likewise, $I_L$ is replaced by one of the signals $I_{L1}$, $I_{L2}$, $I_{L3}$, that is to say, by the output signal of the summator which receives the output of the respective filter.

A person skilled in the art may conceive source separation means which have a direct structure or a mixed, recursive/direct structure.

The summators, the multiplier cells and the filter units may form part of a calculator, microprocessor or digital processing unit of the signal, which unit is programmed for carrying out the described functions.

Figure 5:
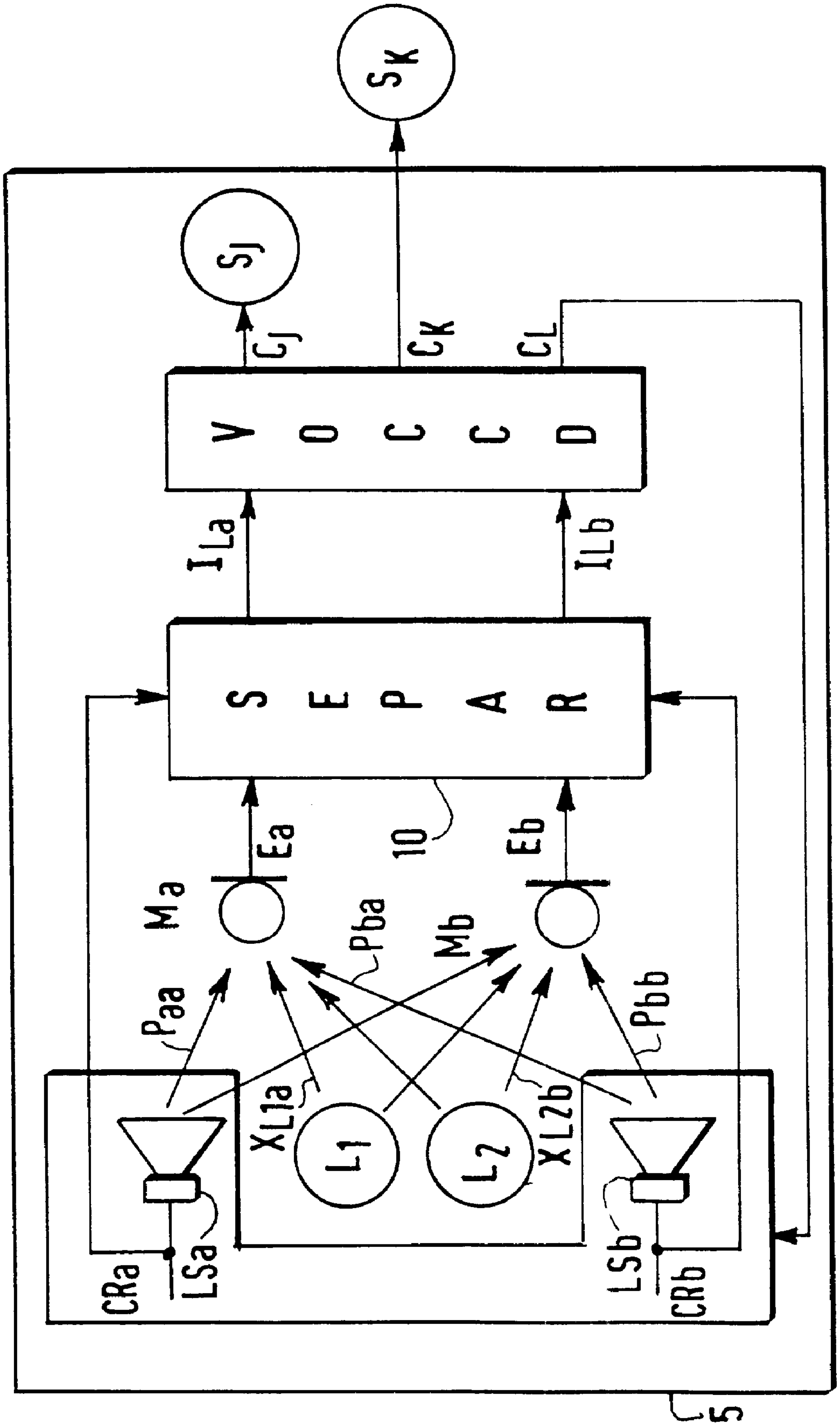
FIG. 5 represents a diagram of an audio system for extracting the voice messages of two speakers, this system further comprising voice recognition means.

FIG. 5 relates to the case where two speakers L1 and L2 may simultaneously send voice messages at the same location. To separate two speakers, or, more generally, two signal sources, it is necessary to utilize two sensors which receive each different mixed signals Ea and Eb which are linked with the position of the speakers relative to the microphones. The mixed signals are formed by the same signals, only the mixtures are different. The same operating principles as those developed in the case of FIG. 1 are implemented. In the case where the interference signals are processed as non-mixed interference signals, the processing means SEPAR 10 thus have two channels, each one comprising the means described with respect to FIG. 2. None the less, it is necessary to connect to the output, two-input-source-separation means for separating the two speakers in accordance with the diagram shown in FIG. 3 reduced to two inputs. In the case where the interference signals are processed as mixed interference signals, the processing means SEPAR 10 are thus formed in accordance with the diagram of FIG. 3 to which is added an additional channel for processing the mixed signal Eb by an adaptation of the diagram for processing the four input signals based on the same principle.

Figure 6:
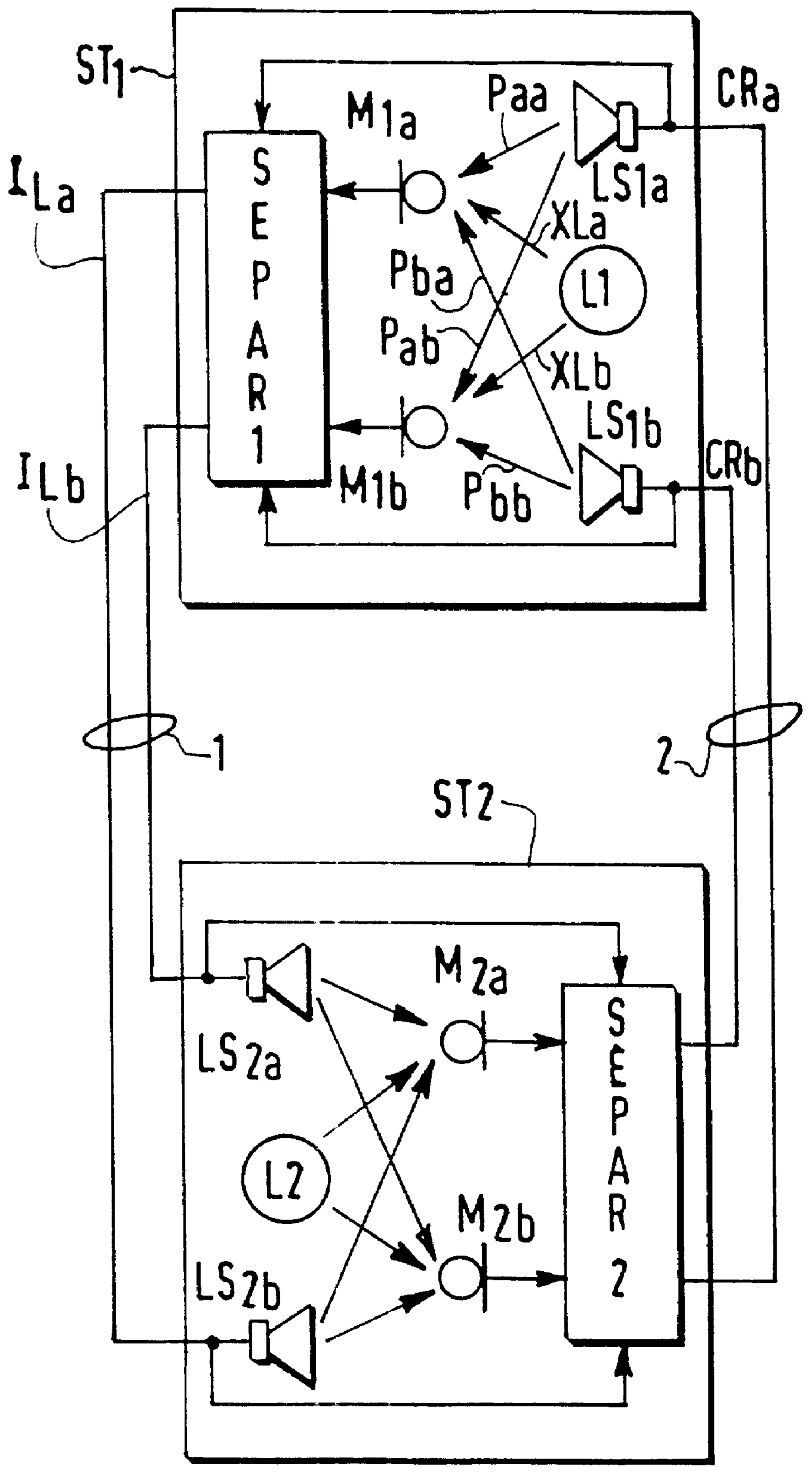
FIG. 6 represents a diagram of a teleconference system comprising processing means for decorrelating the signals.

FIG. 6 relates to the case of an adapted processing system for processing signals exchanged in a teleconference over two-way channels 1, 2. A transmitting station ST1 transmits stereophonic signals $I_{La}$ and $I_{Lb}$ to two loudspeakers $LS_{2a}$ and $LS_{2b}$ of a receiving station ST2. The estimated signals of a station become the correlated electric signals which generate interference for the other station. Evidently, either station is alternately the transmitter and the receiver. In the transmitting station, a speaker L2 utters a message. For transmitting a stereophonic message to the other station it is necessary to have two microphones. The microphones $M_{2a}$ and $M_{2b}$ capture the message of the speaker as well as the sound broadcast by the loudspeakers. If there were no processing, the sound coming from the loudspeakers would continuously circulate between the two stations causing phenomena of echoes to occur which are very annoying for understanding the speakers.

To solve the stereophonic signal problem that has not been solved so far, processing means SEPAR1, and SEPAR2 which decorrelate the estimated signals relative to the stereophonic signals arriving from the loudspeakers, are arranged in each station. A microphone, for example $M_{1a}$ will be capable of receiving the message $X_{La}$ coming from the speaker as well as the interference signals $P_{aa}$ and $P_{ba}$ coming from the respective loudspeakers $LS_{1a}$ and $LS_{1b}$. The microphone will then apply a mixed signal to the processing means SEPAR1. The two correlated electric signals which arrive at the loudspeakers are tapped before the loudspeakers and are fed to the separation means SEPAR1. An estimate of the speaker's message is made for each microphone by the processing means in the same manner as described previously with respect to one mixed input signal and two interference signals. For two microphones, the means of FIG. 2 or FIG. 3 are doubled. Each station can thus isolate two estimates which are transmitted without echoes to the other station along the transmission channels 1 and 2.

That which has been developed previously relates to the production of a correct estimate of the speaker's message. This message may itself contain multiple information signals which have to be decoded. The situation is represented in the FIGS. 1 and 5 in the case where, for example, a system is present in an automobile. Therefore, the estimate $I_L$ is decoded in converter means VOCCD which decode controls contained in the speaker's message. A message may contain various controls $C_L$, $C_J$, $C_K$ intended to act on various pieces of equipment of the system or on parts of the vehicle. More particularly, the control $C_L$ may request to control in return the equipment that produces the stereophonic signals. This may be, for example, a request by the speaker to lower the sound volume of the car radio that produces the stereophonic signals.

Another control $C_J$ may call for varying another sound source $S_J$ which forms part of the system, $S_J$ being subjected to a similar processing.

Another control $C_K$ may relate not to a sound signal source, but to the vehicle itself, for example, to driving an actuator $S_K$ to set the windshield wipers into operation.

What is claimed is:

1. A signal transmission system comprising:

means for generating correlated sound signals from correlated electric signals;

means for generating a wanted sound signal;

at least one sensor for detecting a mixed signal, the mixed signal comprising at least the wanted sound signal and said correlated sound signals; and processing means coupled to said at least one sensor for isolating an estimate for said wanted sound signal contained in said mixed signal, characterized in that the processing means extracts the estimate of the wanted signal contained in the mixed signal by decorrelating, via multiple shifts, the estimate relative, respectively, to the correlated electric signal, said processing means being source separating means and comprising:

a first input for receiving said mixed signal from said at least one sensor;

second inputs for receiving said correlated electric signals;

a first adder having a first input coupled to said first input for receiving said mixed signal;

a second adder having a first input coupled to said first input for receiving one of said correlated electric signals;

a third adder having a first input coupled to another of said second inputs for receiving another one of said correlated electric signals;

a first adaptive filter having in input coupled to an output of the second adder and an output coupled to a second input of said first adder;

a second adaptive filter having an input coupled to an output of said first adder and an output coupled to a second input of said second adder;

a third adaptive filter having an input coupled to the output of said first adder and an output coupled to a second input of said third adder;

a fourth adaptive filter having an input coupled to an output of said third adder and an output coupled to a third input of said first adder;

a fifth adaptive filter having an input coupled to the output of said third adder and an output coupled to a third input of said second adder;

a sixth adaptive filter having an input coupled to the output of said second adder and an output coupled to a third input of said third adder; and adapting means coupled to the outputs of said first, second and third adders for adapting the coefficients of the first, second, third, fourth, fifth and sixth adaptive filters, wherein the output from the first adder forms the estimate of the wanted sound signal, the output from the second adder forms an estimate of one of said correlated sound signals, and the output from the third adder forms an estimate of the other of said correlated sound signals.

2. The system as claimed in claim 1, wherein the sensor is a microphone, the mixed signal is an ambient sound signal captured at a listening end by the microphone, the wanted signal is a voice message sent by a user at the listening end, and the voice message is interfered by stereophonic signals, corresponding to said correlated sound signals, broadcast by loudspeakers comprising said means for generating said correlated sound signals from correlated electric signals, characterized in that the processing means extracts the estimate of the voice message contained in the ambient sound signal by decorrelating the estimate of the voice message relative, respectively, to the stereophonic signals.

3. The system as claimed in claim 2, characterized in that the system further comprises means, following the processing means, for converting the estimate of the voice message into a voice control.

4. The system as claimed in claim 3, characterized in that the voice control acts, in return on the stereophonic signal sources.

5. The system as claimed in claim 2, wherein the system is a teleconference system comprising a transmitting station and a receiving station interconnected by at least an up channel and at least a down channel, the transmitting and receiving stations each comprising at least two microphones and at least two loudspeakers broadcasting two stereophonic signals, characterized in that the processing means eliminates undesirable echoes generated by the stereophonic signals arriving at the transmitting station and coming from the receiving station, the transmitting station transmitting, in stereo, only the estimates of the local voice message to the loudspeakers of the receiving station.

* * * * *